United States Patent
Li et al.

(10) Patent No.: US 12,031,741 B2
(45) Date of Patent: Jul. 9, 2024

(54) HEAT RECOVERY AIR CONDITIONER HOT WATER SYSTEM AND REFRIGERANT FLOW CONTROL METHOD THEREOF

(71) Applicant: Guangdong Giwee Technology Co. Ltd., Foshan (CN)

(72) Inventors: Rongjiang Li, Guangdong (CN); Huandi Yang, Guangdong (CN)

(73) Assignee: GUANGDONG GIWEE TECHNOLOGY CO. LTD., Foshan (CN)

( * ) Notice: Subject to any disclaimer, the term of this patent is extended or adjusted under 35 U.S.C. 154(b) by 0 days.

(21) Appl. No.: 17/708,306

(22) Filed: Mar. 30, 2022

(65) Prior Publication Data

US 2022/0316746 A1    Oct. 6, 2022

(30) Foreign Application Priority Data

Mar. 31, 2021   (CN) .......................... 202110349939.9

(51) Int. Cl.
*F24F 11/83*    (2018.01)
*F24F 11/63*    (2018.01)

(52) U.S. Cl.
CPC .............. *F24F 11/83* (2018.01); *F24F 11/63* (2018.01)

(58) Field of Classification Search
CPC .................................. F24F 11/83; F24F 11/63
See application file for complete search history.

(56) References Cited

U.S. PATENT DOCUMENTS

| 2010/0174412 A1* | 7/2010 | Kwon ...................... F24F 11/84 700/275 |
| 2013/0269379 A1 | 10/2013 | Ue et al. |
| 2013/0306301 A1 | 11/2013 | Tamaki et al. |

FOREIGN PATENT DOCUMENTS

| CN | 101655281 A | 2/2010 |
| CN | 201779921 U | 3/2011 |
| CN | 103851760 A | 6/2014 |
| CN | 109611990 A | 4/2019 |

(Continued)

OTHER PUBLICATIONS

European Search Report for Application No. 22166101.0; dated Aug. 23, 2022; 7 Pages.

(Continued)

*Primary Examiner* — Nael N Babaa
(74) *Attorney, Agent, or Firm* — CANTOR COLBURN LLP

(57) ABSTRACT

A heat recovery air-conditioning hot water system and a refrigerant flow control method therefor. The heat recovery air-conditioning hot water system includes a compressor, a condenser, heat exchangers, an indoor unit, a first throttling device, a second throttling device, a first reversing valve, and a second throttling device, wherein the first reversing valve is used to control the refrigerant switching of the indoor heat exchanger, so as to realize the switching of cooling and heating modes; the second reversing valve is used to control the refrigerant switching of the outdoor heat exchanger, so as to realize the operation switching of cooling and heating modes of the outdoor heat exchanger; and an exhaust pipe of the compressor is respectively connected to the first reversing valve, the second reversing valve, and the water-side heat exchanger by means of a water-side high-pressure air pipe.

9 Claims, 1 Drawing Sheet

(56) References Cited

FOREIGN PATENT DOCUMENTS

| | | | |
|---|---|---|---|
| CN | 109737632 | A | 5/2019 |
| CN | 111692638 | A | 9/2020 |
| EP | 1052124 | A2 | 11/2000 |
| EP | 2725310 | A1 | 4/2014 |
| JP | 2006242524 | A | 9/2006 |
| JP | 2008133979 | A | 6/2008 |
| JP | 2014202378 | A | 10/2014 |

OTHER PUBLICATIONS

Chinese Office Action for Application No. 202110349939.9; Issued Jan. 24, 2022; 9 Pages.

* cited by examiner

HEAT RECOVERY AIR CONDITIONER HOT WATER SYSTEM AND REFRIGERANT FLOW CONTROL METHOD THEREOF

FOREIGN PRIORITY

This application claims priority to Chinese Patent Application No. 202110349939.9, filed Mar. 31, 2021, and all the benefits accruing therefrom under 35 U.S.C. § 119, the contents of which in its entirety are herein incorporated by reference.

TECHNICAL FIELD OF INVENTION

The present invention belongs to the technical field of air conditioners, and in particular relates to a heat recovery air-conditioning hot water system and a refrigerant flow control method therefor.

BACKGROUND OF THE INVENTION

At present, the China's refrigeration and air-conditioning market enjoys great popularity in the world market, and has become the focus of the global refrigeration and air-conditioning industry. Only after more than ten years of development, China's industry has become the world's second largest consumer market and the largest producer of refrigeration and air-conditioning equipment, and has made a great progress in terms of products, varieties, quality, technology levels, etc. In the process of upgrading, energy conservation and environmental protection are always the theme of innovation.

However, the current heat recovery air-conditioning hot water system is complex and difficult to install, and there is no good method to control the refrigerant flow, thus leading to the inability of the system to exert its effect, or the unstable operation of the system, which affects the reliability.

SUMMARY OF THE INVENTION

The technical problem to be solved by the present invention is to provide a heat recovery air-conditioning hot water system and a refrigerant flow control method therefor for overcoming the defects of the prior art.

The technical solution of the present invention for solving the technical problem is as follows: the heat recovery air-conditioning hot water system includes a compressor, a condenser, heat exchangers, an indoor unit, a first throttling device, a second throttling device, a first reversing valve, and a second throttling device, wherein the first reversing valve is used to control the refrigerant switching of the indoor heat exchanger, so as to realize the switching of cooling and heating modes; the second reversing valve is used to control the refrigerant switching of the outdoor heat exchanger, so as to realize the operation switching of cooling and heating modes of the outdoor heat exchanger; and an exhaust pipe of the compressor is respectively connected to the first reversing valve, the second reversing valve, and a water-side heat exchanger by means of a water-side high-pressure air pipe.

According to the above-mentioned heat recovery air-conditioning hot water system, the first reversing valve and the second reversing valve are both four-way valves.

According to the above-mentioned heat recovery air-conditioning hot water system, the first throttling device and the second throttling device are both electronic expansion valves.

According to the above-mentioned heat recovery air-conditioning hot water system, the working modes of the heat recovery air-conditioning hot water system include a pure cooling mode, a pure heating mode, a pure water heating mode, a cooling and water-heating mode, and a heating and water-heating mode.

According to the above-mentioned heat recovery air-conditioning hot water system, the first throttling device and the second throttling device are used to control the refrigerant flow of the system in all the modes.

Due to the design of the first reversing valve and the second reversing valve as well as the control by the first throttling device and the second throttling device, the heat recovery air-conditioning hot water system provided by the embodiment can flexibly realize the operation of multiple modes including the pure cooling mode, the pure heating mode, the pure water heating mode, the cooling and water-heating mode, and the heating and water-heating mode, thus realizing a heat recovery function. Moreover, the water-side heat exchanger is connected by means of the water-side high-pressure air pipe, so that a high-temperature and high-pressure gaseous refrigerant may be provided to ensure that the water-side heat exchanger is always at the high-temperature side, and water heating is effectively realized while the possibility of frost crack of a water module is avoided. The system can be flexibly used, and easy to install.

In a further aspect, the present invention also provides a refrigerant flow control method. The refrigerant flow control method is used for the foregoing heat recovery air-conditioning hot water system, and includes the following steps:

determining the working mode of the air-conditioning hot water system; and when the system is running in the working mode of cooling and water-heating, detecting temperature parameters of a corresponding measuring point by using a temperature detection unit, and controlling the first throttling device and the second throttling device according to the detected temperature parameter values.

According to the above-mentioned refrigerant flow control method, when the system is running in the working mode of cooling and water-heating, the temperature parameters of the corresponding measuring point are detected by using the temperature detection unit, and controlling the first throttling device and the second throttling device according to the detected temperature parameter values is specifically: controlling the opening degree value of the first throttling device according to a temperature value of an outlet pipe of an evaporator.

According to the above-mentioned refrigerant flow control method, when the system is running in the working mode of cooling and water-heating, the temperature parameters of the corresponding measuring point are detected by using the temperature detection unit, and controlling the first throttling device and the second throttling device according to the detected temperature parameter values is specifically: controlling the opening degree value of the second throttling device according to an exhaust temperature value.

According to the above-mentioned refrigerant flow control method, controlling the opening degree value of the first throttling device according to the temperature value of the outlet pipe of the evaporator is specifically: when the temperature of the outlet pipe of the evaporator of the indoor unit is high, the opening degree of the first throttling device is reduced to make more refrigerant evaporate and refrigerate in the indoor unit and further improve the refrigeration effect; and when the temperature of the outlet pipe of the evaporator of the indoor unit is low, the opening degree of the first throttling device is increased to achieve an effect of bypassing the refrigerant flow and reduce the refrigerant flow of the indoor unit.

According to the above-mentioned refrigerant flow control method, controlling the opening degree value of the second throttling device according to the exhaust temperature value is specifically: when the exhaust temperature is high, the opening degree of the second throttling device is large; and when the exhaust temperature is low, the opening degree of the second throttling device is small, and the opening degree of the first throttling device is controlled according to the average temperature at an outlet of the evaporator of the started indoor unit.

In the refrigerant flow control method provided by the embodiment, when the heat recovery air-conditioning hot water system is running in the cooling and water-heating mode, the opening degree of the first throttling device is controlled by monitoring the pipe temperature of the heat exchangers of the indoor unit, and furthermore, the second throttling device is controlled in combination with the exhaust temperature, so that the effects of stable and reliable system operation and uniform refrigerant distribution are achieved.

BRIEF DESCRIPTION OF THE DRAWINGS

To more clearly illustrate the technical solution in the embodiments of the present invention or in the prior art, the drawings required in the description of the embodiments of the present invention or the prior art are briefly described below; and it is apparent to those of ordinary skill in the art that the drawings are merely some embodiments of the present invention, and other drawings may also be obtained according to these drawings without creative work.

Figure 1:
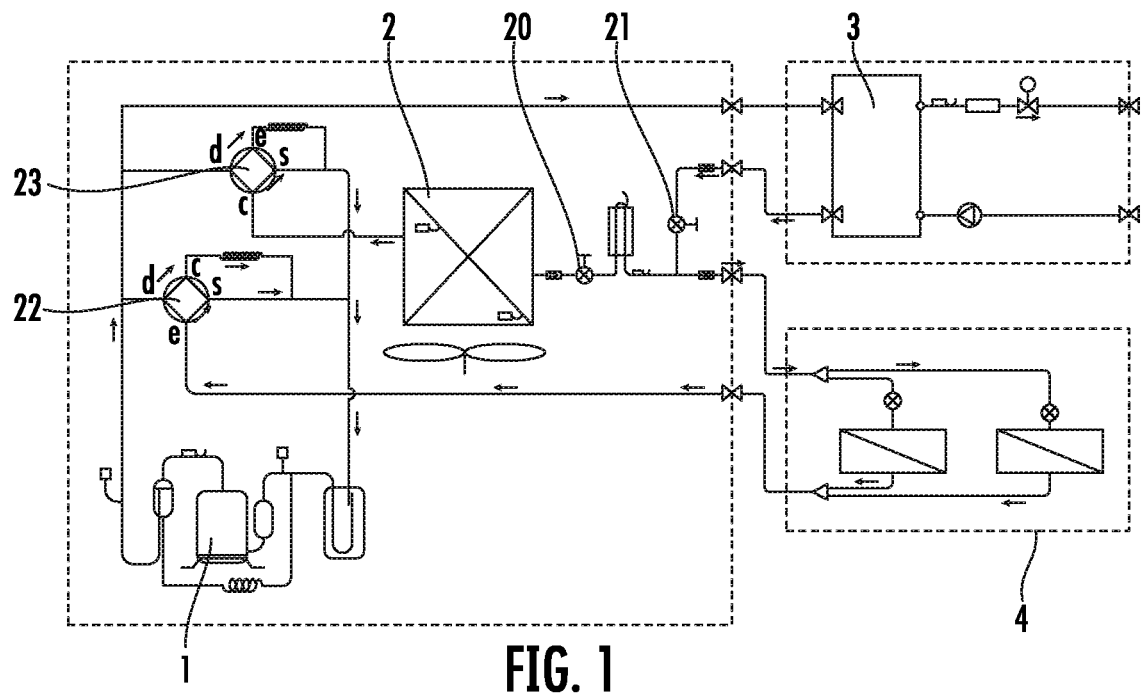
FIG. 1 is a structural diagram of a heat recovery air-conditioning hot water system provided by present invention.

Reference numerals in the drawings: 1—Compressor, 2—Condenser, 3—Heat exchangers, 4—Indoor unit, 20—First throttling device, 21—Second throttling device, 22—First reversing valve, 23—Second reversing valve.

DETAILED DESCRIPTION OF THE INVENTION

In order to make those skilled in the art better understand the technical solution of the present invention, the present invention will be described in detail below with reference to the drawings. The description in this section is only exemplary and explanatory, and should not have any limitation to the protection scope of the present invention.

It should be noted that similar reference numerals and letters indicate similar items in the following drawings. Therefore, once a certain item is defined in a drawing, it does not need to be further defined and interpreted in the subsequent drawings.

It should be noted that the orientation or position relationships indicated by terms such as "center," "upper," "lower," "left," "right," "vertical," "horizontal," "inside," and "outside' are based on the orientation or position relationships shown in the drawings, or the orientation or position relationships when the product provided by the present invention is usually placed in use, which is only for the convenience of describing the present invention and simplifying the description, rather than indicating or implying that the devices or elements referred to must have specific orientations and must be constructed and operated in the specific orientations, so the terms cannot be understood as a limitation to the present invention. In addition, the terms "first," "second," and "third" are used only to distinguish descriptions and cannot be understood as indicating or implying relative importance.

Furthermore, the terms such as "horizontal," "vertical," and "overhanging" do not imply that a component is required to be absolutely horizontal or overhanging, but rather may be slightly inclined. For example, the "horizontal" simply means that its direction is more horizontal relative to the "vertical," and it does not mean that the structure must be completely horizontal, but can be slightly inclined.

In the description of the present invention, it should also be noted that the terms "dispose," "install," "interconnect," and "connect" should be understood in a broad sense, unless otherwise specified and limited; for example, it may be a fixed connection, a detachable connection, or an integral connection; it may be a mechanical connection or an electrical connection; it may be a direct connection, or an indirect connection through an intermediate medium; and it also may be an internal communication between the two elements. For those of ordinary skill in the art, the specific meanings of the above terms in the present invention can be understood in accordance with the specific situations.

Referring to FIG. 1, a heat recovery air-conditioning hot water system includes a compressor 1, a condenser 2, water side heat exchanger 3, an indoor unit 4, a first throttling device 20, a second throttling device 21, a first reversing valve 22, and a second reversing valve 23, wherein the first reversing valve 22 is used to control the refrigerant switching of the heat exchangers 4 of the indoor unit, so as to realize the switching of cooling and heating modes; the second reversing valve 23 is used to control the refrigerant switching of the outdoor heat exchanger 2, so as to realize the operation switching of cooling and heating modes of the outdoor heat exchanger 2; and an exhaust pipe of the compressor 1 is respectively connected to the first reversing valve 22, the second reversing valve 23, and the water-side heat exchanger 3 by means of a water-side high-pressure air pipe. The water-side heat exchanger 3 is connected by means of the water-side high-pressure air pipe, so that a high-temperature and high-pressure gaseous refrigerant may be provided to ensure that the water-side heat exchanger 3 is always at the high-temperature side, and water heating is effectively realized while the possibility of frost crack of a water module is avoided. Control of components of the heat recovery air-conditioning hot water system may be performed by a controller, such as a microprocessor-based controller programmed to carry out the operations described herein.

Specifically, the first reversing valve 22 and the second throttling device 23 are both four-way valves.

Specifically, the first throttling device 20 and the second throttling device 21 are both electronic expansion valves.

Specifically, the working modes of the heat recovery air-conditioning hot water system include a pure cooling mode, a pure heating mode, a pure water heating mode, a cooling and water-heating mode, and a heating and water-heating mode.

Specifically, the first throttling device 20 and the second throttling device 21 are used to control the refrigerant flow of the system in all the modes.

Due to the design of the first reversing valve 22 and the second reversing valve 23 as well as the control by the first throttling device 20 and the second throttling device 21, the heat recovery air-conditioning hot water system provided by the embodiment can flexibly realize the operation of multiple modes including the pure cooling mode, the pure heating mode, the pure water heating mode, the cooling and water-heating mode, and the heating and water-heating mode, thus realizing the heat recovery function. Furthermore, the system can be used by flexibly switching the modes, and is easy to install.

Figure 2:
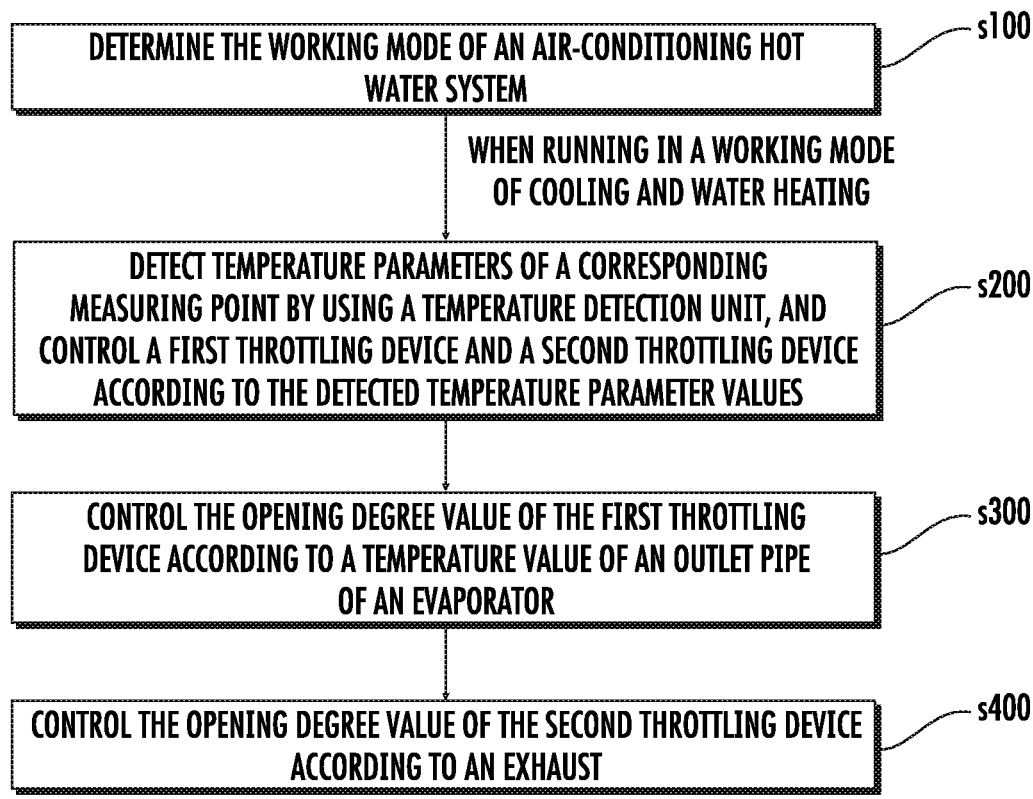
FIG. 2 is a flow chart of a refrigerant flow control method provided by the present invention.

In a further aspect, the present invention also provides a refrigerant flow control method. The refrigerant flow control method is used for the foregoing heat recovery air-conditioning hot water system. Referring to FIG. 2, FIG. 2 is a flow chart of the refrigerant flow control method, and the method includes the following steps: S100: determining the working mode of the air-conditioning hot water system; S200: when the system is running in the working mode of cooling and water-heating, detecting temperature parameters of a corresponding measuring point by using a temperature detection unit, and controlling the first throttling device 20 and the second throttling device 21 according to the detected temperature parameter values; S300: controlling the opening degree value of the first throttling device 20 according to the temperature value of an outlet pipe of an evaporator; and S400: controlling the opening degree value of the second throttling device 21 according to the exhaust temperature value.

Specifically, in the step S300, controlling the opening degree value of the first throttling device 20 according to the temperature value of the outlet pipe of the evaporator is specifically: when the temperature of the outlet pipe of the evaporator of the indoor unit 4 is high, the opening degree of the first throttling device 20 is reduced to make more refrigerant evaporate and refrigerate in the indoor unit 4 and further improve the refrigeration effect; and when the temperature of the outlet pipe of the evaporator of the indoor unit 4 is low, the opening degree of the first throttling device 20 is increased to achieve an effect of bypassing the refrigerant flow and reduce the refrigerant flow of the indoor unit 4.

Specifically, in the step S400, controlling the opening degree value of the second throttling device 21 according to the exhaust temperature value is specifically: when the exhaust temperature is high, the opening degree of the second throttling device 21 is large; and when the exhaust temperature is low, the opening degree of the second throttling device 21 is small, and the opening degree of the first throttling device 20 is controlled according to the average temperature at an outlet of the evaporator of the started indoor unit 4.

In the refrigerant flow control method provided by the embodiment, when the heat recovery air-conditioning hot water system is running in the cooling and water-heating mode, the opening degree of the first throttling device 20 is controlled by monitoring the pipe temperature of the heat exchangers of the indoor unit 4, and furthermore, the second throttling device 21 is controlled in combination with the exhaust temperature, so that the effects of stable and reliable system operation and uniform refrigerant distribution are achieved.

The above-mentioned embodiments are only exemplary embodiments of the present invention, and do not limit the present invention in any form. More possible alterations, embellishments or modifications, made by those skilled in the art by using the technical content disclosed above without departing from the scope of the technical solution of the present invention, to the technical solution of the present invention are equivalent embodiments of the present invention. Therefore, all equivalent changes made in accordance with the idea of the present invention without departing from the content of the technical solution of the present invention shall be included in the protection scope of the present invention.

What is claimed is:

1. A refrigerant flow control method for a heat recovery air-conditioning hot water system, including a compressor (1), an outdoor heat exchanger (2), a water-side heat exchanger (3), an indoor unit (4), a first throttling device (20), a second throttling device (21), a first reversing valve (22), and a second reversing valve (23), wherein:
the first reversing valve (22) is used to control the refrigerant switching of a heat exchanger of the indoor unit (4), so as to realize the switching of cooling and heating modes;
the second reversing valve (23) is used to control the refrigerant switching of the outdoor heat exchanger 2, so as to realize the operation switching of cooling and heating modes of the outdoor heat exchanger 2; and
an exhaust pipe of the compressor (1) is respectively connected to the first reversing valve (22), the second reversing valve (23), and the water-side heat exchanger (3) by means of a water-side high-pressure air pipe such that the water-side heat exchanger (3) is directly connected to the exhaust pipe of the compressor (1) and always at the high-temperature side of the system;
the method comprising:
determining (S100) the working mode of the air-conditioning hot water system; and
the system running in the working mode of cooling and water-heating, detecting (S200) temperature parameters of a corresponding measuring point and controlling the first throttling device (20) and the second throttling device (21) according to the detected temperature parameter values;
wherein the temperature parameters include at least one of a temperature value of an outlet pipe of the heat exchanger of the indoor unit (4) and an exhaust temperature value at the exhaust pipe.

2. The refrigerant flow control method according to claim 1, wherein the first reversing valve (22) and the second reversing device (23) are both four-way valves.

3. The refrigerant flow control method according to claim 1, wherein the first throttling device (20) and the second throttling device (21) are both electronic expansion valves.

4. The refrigerant flow control method according to claim 1, wherein the working modes of the heat recovery air-conditioning hot water system include a pure cooling mode, a pure heating mode, a pure water-heating mode, a cooling and water-heating mode, and a heating and water-heating mode.

5. The refrigerant flow control method according to claim 4, wherein the first throttling device (20) and the second throttling device (21) are used to control the refrigerant flow of the system in the working modes.

6. The refrigerant flow control method according to claim 1, wherein when the system is running in the working mode of cooling and water-heating, the temperature parameters of the corresponding measuring point are detected, and controlling the first throttling device (20) and the second throttling device (21) according to the detected temperature parameter values includes: controlling the opening degree value of the first throttling device (20) according to a temperature value of an outlet pipe of the heat exchanger of the indoor unit (4).

7. The refrigerant flow control method according to claim 1, wherein when the system is running in the working mode of cooling and water-heating, the temperature parameters of the corresponding measuring point are detected, and controlling the first throttling device (20) and the second throttling device (21) according to the detected temperature parameter values includes: controlling the opening degree value of the second throttling device (21) according to an exhaust temperature value at the exhaust pipe.

8. The refrigerant flow control method according to claim 6, wherein controlling the opening degree value of the first throttling device (20) according to the temperature value of the outlet pipe of the heat exchanger of the indoor unit (4) includes: reducing the opening degree of the first throttling device (20) to make more refrigerant evaporate and refrigerate in the heat exchanger of the indoor unit (4) and further improve the refrigeration effect; and increasing the opening degree of the first throttling device (20) to achieve an effect of bypassing the refrigerant flow and reduce the refrigerant flow to heat exchanger of the indoor unit (4).

9. The refrigerant flow control method according to claim 7, wherein the opening degree of the first throttling device (20) is controlled according to an average temperature at an outlet of the heat exchanger of the indoor unit (4).

\* \* \* \* \*